Sept. 26, 1967            A. D. BENNETT            3,344,396

SEISMIC SURVEYING BY RECORDING THE SIGNAL USED
TO CONVOLVE EITHER UP-GOING OR DOWN-GOING
SEISMIC SIGNALS TO PRODUCE THE OTHER

Filed April 4, 1966            4 Sheets-Sheet 1

INVENTOR.
ARTHUR D. BENNETT
BY Paul F. Hawley
ATTORNEY

ARTHUR D. BENNETT
INVENTOR.

BY Paul F. Hawley
ATTORNEY

United States Patent Office 3,344,396
Patented Sept. 26, 1967

3,344,396
SEISMIC SURVEYING BY RECORDING THE SIGNAL USED TO CONVOLVE EITHER UP-GOING OR DOWN-GOING SEISMIC SIGNALS TO PRODUCE THE OTHER
Arthur D. Bennett, Tulsa, Okla., assignor to Pan American Petroleum Corporation, Tulsa, Okla., a corporation of Delaware
Filed Apr. 4, 1966, Ser. No. 540,056
7 Claims. (Cl. 340—15.5)

ABSTRACT OF THE DISCLOSURE

This invention covers an improved method of seismic geophysical prospecting by means of which it is possible to minimize the effects of multiple reflections. Such reflections, as the name indicates, are seismic waves which are reflected off more than one subsurface elastic discontinuity before reaching the geophones. Separate reproducible records are made of down-going and up-going seismic waves. The down-going record can be reproduced and convolved with an amplitude-time signal which is essentially a Wiener filter to produce a convolved record which is essentially the second, up-going record. This amplitude-time signal is then recorded. It has been found that this amplitude-time signal contains predominantly the primary reflections and not the multiple reflections.

Alternatively, such convolution can be carried out with the reproduced, up-going wave in order to match the reproduced down-going wave. In this case, the Wiener filter giving such a matching effect (which is recorded) is a record predominantly of the multiple reflections.

---

This invention pertains to the art of seismic geophysical prospecting. More particularly, it comprises a method for minimizing multiple reflections occurring in the records used in seismic reflection prospecting.

In seismic geophysical prospecting as currently practiced, one well-recognized difficulty lies in the fact that reflected waves arriving at a spread of geophones may be due not to a single reflection, but may involve multiple reflections from the surface, the bottom of the weathered layer, or other reflecting beds. It is frequently impossible to distinguish deep primary reflections from shallow multiple reflections.

It is an object of this invention to minimize the effect of multiple reflections occurring in seismic geophysical prospecting. To accomplish this, seismic waves are generated and received, but either in the source or in the receiving system a directional characteristic is deliberately employed, so that separate records can be made of essentially down-going and essentially up-coming waves. I have found that these two records are different in appearance due to their differing content of multiple reflections. However, if one reproduces the record of the down-going waves, and convolves it with an amplitude-time signal which can be adjustable as desired, it is possible to produce a second record which can be made substantially identical with the other record of the up-coming waves. I have found that when this is done, the amplitude-time signal itself constitutes a record in the form of a seismic trace on which the primary reflections are still present in proper time, phase, and amplitude but in which the multiple reflections involving either the earth's surface or the base of the weathered layer have been essentially removed. Other multiples may be present. However, these generally are of low amplitude and rarely cause major difficulty in record interpretation. By this technique, then, it is possible to produce an amplitude-time signal which can be recorded and which contains the essential information for plotting the depth and dip of the reflections due to the primary reflected waves without the misleading information from most of the multiple reflections otherwise present.

Other objects of this invention will be apparent from a perusal of this specification, which is illustrated by the appended drawings which form a part of the specification and are to be read in connection therewith.

Figure 1:
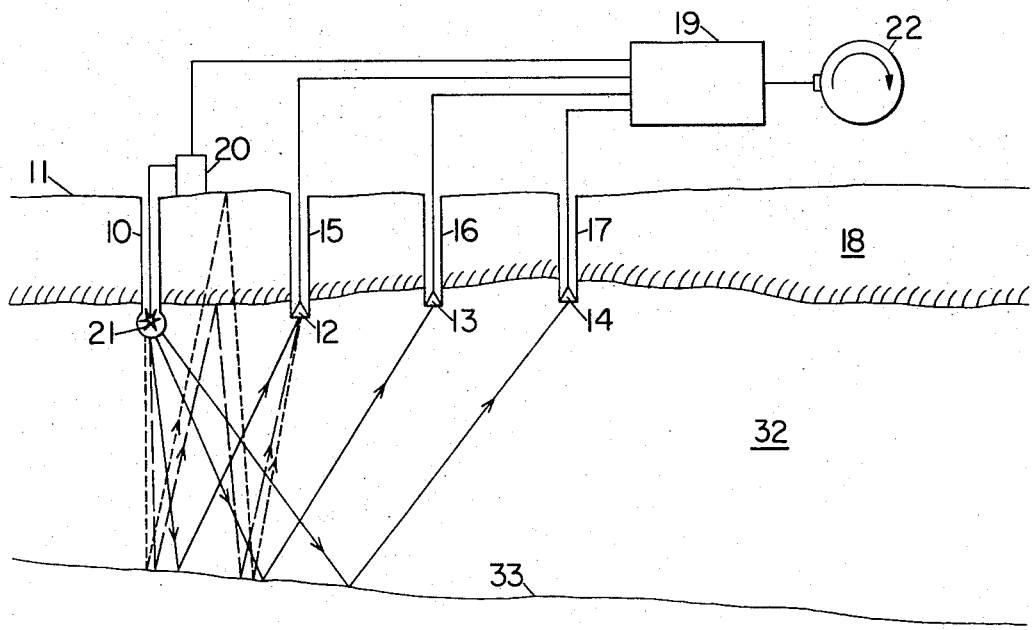
FIGURE 1 represents an exploration system in diagrammatic form including a source of seismic waves, a plurality of receivers and recording apparatus suitable for use in one embodiment of my method.

In FIGURE 1 a shot hole 10 has been drilled below the surface of the earth 11 preferably but not necessarily to a depth greater than the thickness of the weathered layer 18 at that point. Unlike the conventional system for seismic prospecting, the spread of geophones 12, 13, and 14 (ordinarily, of course, there will be many more) is placed in other holes 15, 16, and 17 which have been drilled to a depth exceeding that of the weathered layer and of the charge 21. Preferably, such holes terminate at substantially the same horizontal plane.

The geophones 12–14 are connected by the usual geophone cables to the seismic amplifier 19 which may contain desired filters, volume controls, and the like. A detonating means 20 such as a blaster for an explosive charge 21 (which can be a conventional concentrated charge of dynamite) is likewise connected to the seismic recording amplifier 19 to provide the time break or instant of detonation, as is well known in this art. Separate traces of the response of the geophones 12, 13, and 14, are reproducibly recorded, for example, on a multichannel magnetic tape recorder shown diagrammatically by reference number 22. The time break is also recorded.

The geophones 12, 13, and 14 are not the conventional type but are directionally sensitive geophones, which will produce records of the seismic waves passing substantially vertically upwards but not downwards or (by a suitable manipulation) substantially downwards but not upwards. Arrangements of transceivers which are directionally sensitive have been described already in the art. For example, I may employ for such geophones the directional receivers shown in U.S. Patent 2,846,662 of N. R. Sparks or 2,740,945 of E. T. Howes. It is to be understood that for the production of one reproducible record on recorder 22, all of the geophones 12–14 in the spread are arranged to record the same type of waves, either all up-going or all down-going.

With the equipment arranged as shown in FIGURE 1, the explosive charge 21, which is a seismic source sending out energy in all directions, is detonated and the shot instant and response of the directionally sensitive geophones 12–14 are recorded on recorder 22. Notation is suitably made as to whether the record was of up-going or down-going seismic waves. A second charge of explosive is then located as near as possible at the same depth in shot hole 10, the geophones 12–14 are reconnected to respond only to the other mode of seismic waves (down-going if the first set was up-going) and the procedure is repeated to make a separate reproducible record of the response of the geophones to the impulsive seismic source. It is to be understood that the geophones 12–14 occupy the same location during both recording periods. While it is desirable that the seismic source 21 be located geographically at the same spot for both detonations, this is not essential though it is required that it be located close enough so that the seismic waves generated the second time will follow essentially the same paths as those generated by the first explosion. Roughly, this means that the second explosion should occur within 50 feet of the first.

The treatment of the two separate reproducible records, one of the response to down-going and the other the response to up-going waves at the geophone spread, will be discussed below.

It is very desirable in carrying out my method that the reproducible records made in the field be in the form of the response of geophones to the seismic waves resulting from an impulsive seismic source, i.e., that in which energy is applied to the ground for only a few milliseconds. This does not mean that the source must be necessarily explosive nor that the seismic waves applied be limited in time. For example, in FIGURE 2 there is shown an arrangement in which a vibrator 23 is used instead of the impulsive source 21 of FIGURE 1. This is mounted on the surface of the earth 11 to serve as a source of seismic waves. This may be a mechanical, hydraulic, electrodynamic or other type of transducer which will follow a control signal from a pilot signal source 24 to apply an equivalent force to the earth. The geophones 12, 13, and 14 are again of the directionally characteristic type discussed above and are mounted in wells 15, 16, and 17 as discussed in connection with FIGURE 1. If the vibrator 23 is used to generate a unique signal, which for example can be of the order of 4 to 10 seconds or longer in duration, as taught in such patents as U.S. 2,688,124, Doty et al., the amplified output from the geophones is correlated with the pilot signal put out by the signal source 24. Accordingly, the individual outputs from the geophones are amplified by amplifier 19 and are temporarily recorded individually on a multi-track reproducible recorder 25. The individual tracks are passed, for example, to adjacent individual correlating heads 26 which preferably are arranged as shown in U.S. Patent 3,174,142, Mallinckrodt. This converts the geophone response from that due to the vibrator 23 to that resulting from an impulsive seismic source such as source 21. The output can then be further amplified if desired by amplifier 27 and reproducibly recorded as individual traces on multi-track recorder 22. This record is one of a pair, the second being made with the same arrangement except a reversal in directional sensitivity of the geophones 12–14. The record pairs are then treated as discussed below, or as those obtained from the arrangement shown in FIGURE 1.

Figure 2:
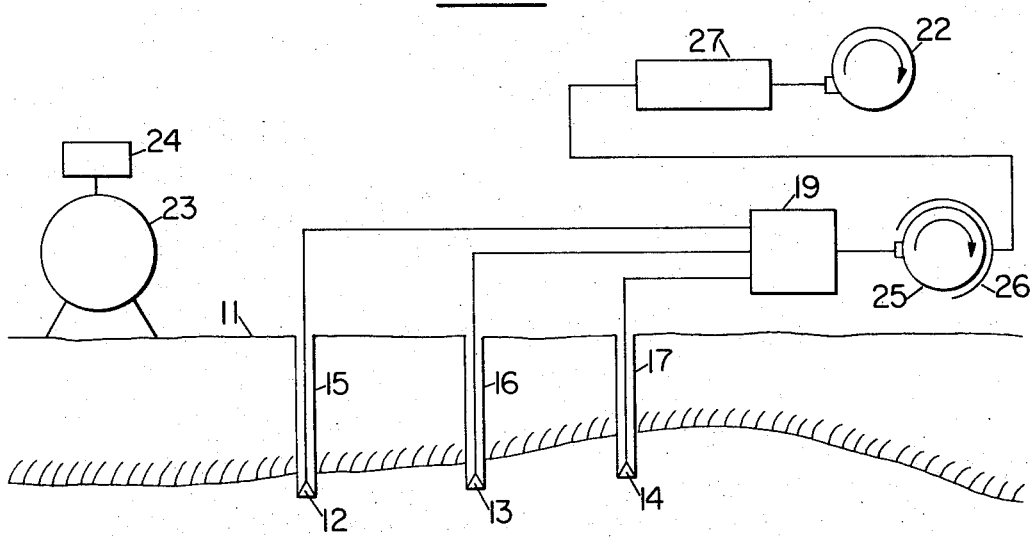
FIGURE 2 illustrates a second embodiment of this invention in diagrammatic form in which a different type of seismic source is employed.

It is further to be understood that the so-called unique signal type of prospecting (sometimes called by the trade name "Vibroseis") is not the only kind of vibratory method which can be employed. For example, U.S. Patent 3,182,743, McCollum, shows a system in which a succession of separated, truncated bursts of sinusoidal seismic energy is impressed from a vibrator into the ground. The wave trains produced, each of controlled amplitude and time but different number of cycles, are picked up by each geophone in the spread and subsequently stacked or added in overlapping relationship so that the resultant record closely resembles that due to response of geophones to seismic waves resulting from an impulsive seismic source. Such a system may be employed in essentially a combination of the equipment shown in FIGURES 1 and 2. That is, the vibrator shown in FIGURE 2 is used with the apparatus configuration of FIGURE 1, response from each truncated wave train being superimposed on the reproducible record of recorder 22. After the complete set has been recorded as taught in the McCollum patent, the directional sensitivity of the geophones 12–14 is reversed and a new record made on recorder 22 in exactly the same arrangement.

It is thus apparent that a number of arrangements of vibratory seismic sources can be used with a spread of directionally sensitive geophones to produce reproducible records in the form of responses of geophones to seismic waves resulting from an impulsive seismic source.

Figure 3:
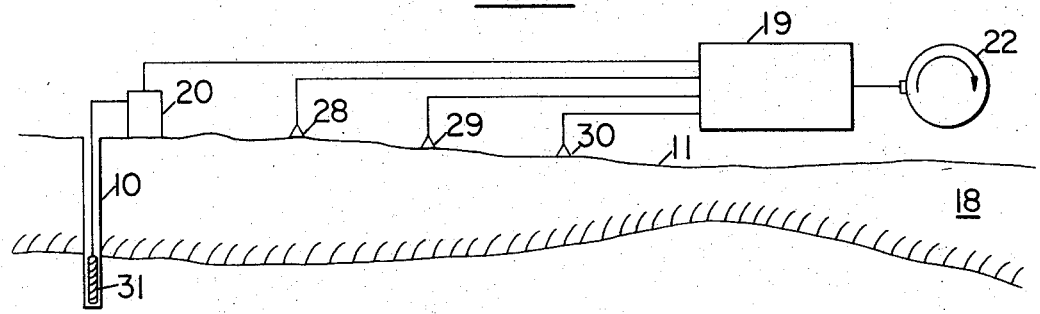
FIGURE 3 illustrates diagrammatically another form of exploration system in which a different type of seismic source is used for obtaining directionally characteristic seismic waves.

Before referring to the deconvolution part of the process, which is common to all phases of this invention, it should be pointed out that it is possible to use a spread of ordinary geophones, i.e., those having equal response to up-going and down-going seismic waves. One arrangement to accomplish this is shown in FIGURE 3. In this case the shot hole 10 has been drilled preferably to below the bottom of the weathered layer 18. A spread of geophones 28–30 has been laid out at or near the surface 11 and the outputs, together with the line from the detonator 20, have been connected to amplifier 19 for subsequent individual trace recording on the magnetic multi-trace recorder 22. In this case, however, the directional characteristic with respect to the seismic waves is not produced by using directionally sensitive seismometers but by using directional charges. Such charges are now well known in the art and are described, for example in U.S. Patents 2,609,885 and 2,770,312, Silverman. Essentially, a linear explosive in the form of a helix, which may or may not be supplemented with additional small lumped charges of explosive, is prepared such that the axial velocity of detonation of the helical charge is roughly the same as the velocity of seismic waves in the solid medium surrounding the charge. Thus, for example in FIGURE 3, the detonation velocity along the helical charge 31 should be within the range of one-half to twice the velocity of compressional seismic waves in the formation 32 adjacent the charge 31. A first record is made in accordance with standard geophysical operations, detonating a helical charge 31 from one end of this charge. For instance, the detonating cap might be inserted in the top of this charge. Seismic waves reaching each of the geophones 28–30 are individually recorded on the reproducible medium on recorder 22. Another helical charge is then prepared with the detonating cap at the opposite end from the shaped charge first used, in this case the bottom, and the procedure is repeated to make a second reproducible record of the geophone response on the recorder 22. Other means of producing directional charges are already known. It is to be understood that any may be employed to produce pairs of records with directional sensitivity imparted by detonating one of each pair of charges from one end and the other from the opposite end of the charges. It is preferable that all such charges be placed below the bottom of the weathered layer 18. It is also preferable that the pair of directional charges be located at about the same depth in the same hole or at least within roughly 50 feet of each other.

A few of the paths by which seismic waves resulting from the source reach the geophones have been shown in FIGURE 1. It is to be understood that many of the wave paths have not been shown simply to make consideration of the seismic events more easy to visualize. It is also understood that similar wave paths exist as to all other configurations which can be made in applying my invention, for example, in FIGURE 2 or 3.

Upon detonation of the explosive source 21, a strong compressional wave is propagated downward from the source towards the various subsurface reflecting planes between strata with different acoustical resistance, such as plane 33. A part of this wave, in turn, is reflected from plane 33 and ultimately arrives at geophones 12–14. Such wave propagated along the wave paths shown in solid lines in FIGURE 1, involving only one reflection between source 21 and geophones 12–14, is called the primary reflection. It is the arrival of this particular wave which is sought in reflection seismic prospecting.

Since the surface of the ground 11 is a very good reflector for seismic waves, very shorty after the primary reflection reaches the geophones, there will be the arrival of a wave of opposite phase, a secondary reflection, which was initially directed upward, reflected from surface 11 and then reflected upward from the plane 33. A third wave may be reflected from the base of the weathered layer 18, then from plane 33, again to arrive at the geophones. Arrival of the waves reflected from the surface and from the base of the weathered layer, then from the reflecting horizon ordinarily does not obscure identification of the primary reflection.

The arrival of other waves, however, causes confusion. For example, a compressional wave down-going from detonation of charge 21 follows the dotted line path, is reflected upwards, reflected again from the surface 11, then again from plane 33 to geophone 12. This is a multiple reflection. It has a travel time somewhat greater than twice that of the primary reflection. Still another multiple reflection is shown by the dashed lines, reflecting twice from plane 33 and once from the base of the weathered layer 18. These multiple reflections are also received by the other geophones in the spread; the corresponding seismic paths were omitted for clarity in illustration.

Further multiples exist due to reflection, for example, from a second reflecting plane 34, reflection from plane 33, and a second reflection from plane 34 before impingement on the geophone spread. However, in practice I have found that the so-called interbed multiples are low in amplitude compared with the multiples reflected at least once from the surface or the base of the weathered layer, or with the primary reflections. Accordingly, it is the multiple reflections involving at least one reflection from the surface of the earth or the base of the weathered layer, which one most desires to eliminate from consideration. The reason for this is that such multiples appear on the record to be primary reflections from deeper horizons. They give rise to wrong depth determinations. They may also obscure true primary reflections.

It is precisely such multiple reflections that my method is designed to eliminate.

I have found that when one convolves the down-going wave trace of a pair of directionally characteristic records produced as indicated above, with an amplitude-time signal which comprises a Wiener operator chosen so as to produce as a result of this convolution the other of this pair of records, this amplitude-time signal is in itself a seismic prospecting depth record similar to a conventional seismogram, in which all of the primary reflections are present in essentially their original relative amplitudes, but in which all multiples involving at least one reflection from the earth surface or the base of the weathered layer have been eliminated. More accurately, the material eliminated from the amplitude-time signal comprising the Wiener filter includes all multiple reflections involving reflection from a surface which is above the source or geophone, whichever is deeper. Thus, in FIGURE 2, one eliminates all multiples involving at least one reflection from above the depth of the geophone, and in FIGURE 3, multiple reflections in which at least one reflection occurs above the depth of source 31.

Essentially this results from a consideration of what time-domain convolution operator will, when convolved with one of such pair of traces, produce a good approximation to the other trace. In fact, the essence of my discovery is that such an operator is one which, in a noise-free synthetic case (which is all that can be considered in theory), will contain individual pulses at the times and amplitudes of only the primary reflections and those interbed multiple reflections in which the uppermost reflection point is below the lowest point of source and receiver.

Figure 5:
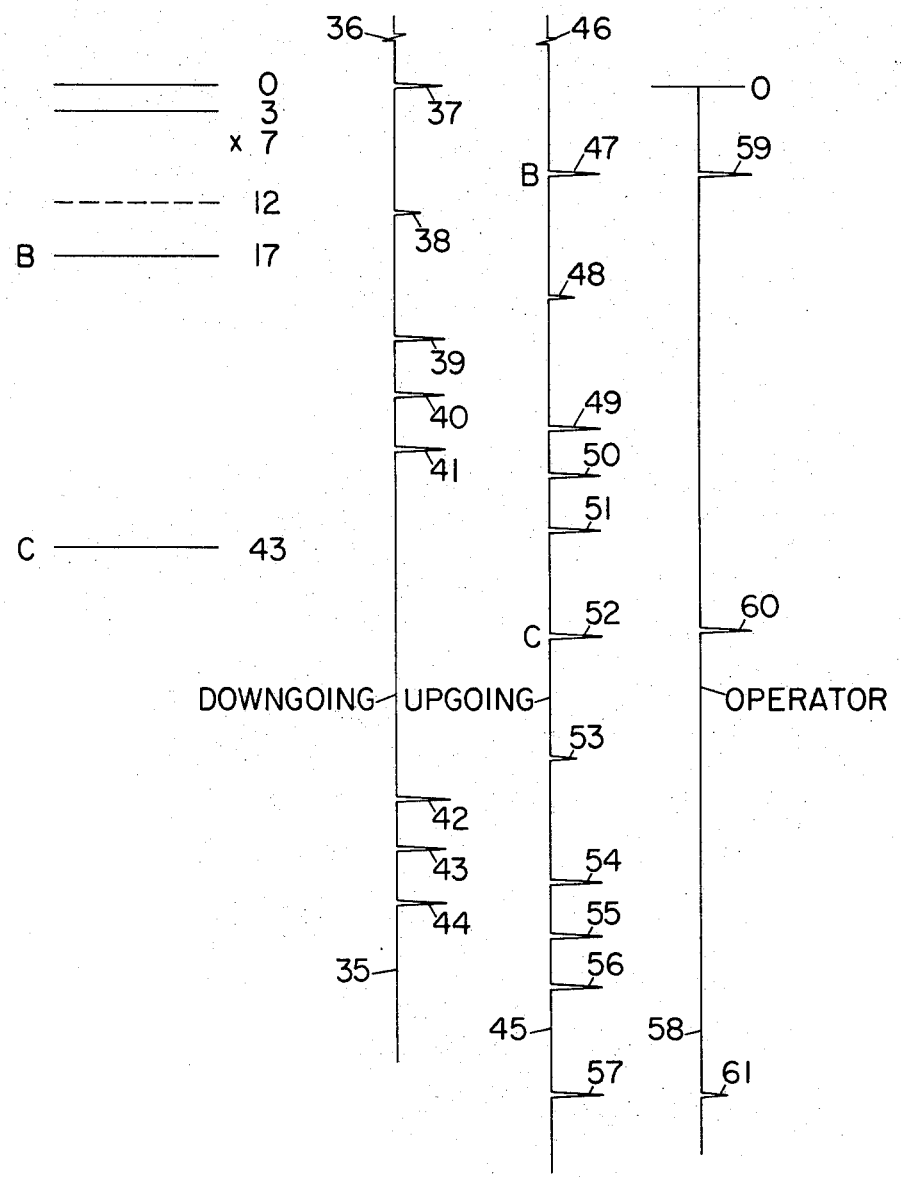
FIGURE 5 is a diagram of the theoretical response of a geophone, first to down-going seismic waves due to a particular layered configuration, and next to up-going waves under the same circumstances and, finally a Wiener operator which, when convolved with the first of these, produces a least-squares-error approximation to the second.

For example, at the left in FIGURE 5 is shown a series of beds existing at a particular location. Directly to the right of these is listed the travel time in milliseconds for a compressional wave from the surface of the earth to the particular bed in question. The first interface at 3 milliseconds is the base of the weathered layer. Bed B occurs at a travel time of 17 milliseconds and bed C at 43 milliseconds. It is postulated that, as shown in FIGURE 1, an explosive source is located at a depth corresponding to a travel time of 7 milliseconds and geophones at a depth corresponding to 12 milliseconds, as shown by the dashed line. When a shot is detonated at the designated point, the record of down-going energy only, trace 35, will show after the shot instant 36 the arrival of the down-going compressional energy from the shot 5 milliseconds after this shot. This is shown diagrammatically by pulse 37. Compressional energy reflected from the surface passes the same geophone at 19 milliseconds, pulse 38. Compressional energy from a multiple reflection, first from bed B and then from the base of the weathered layer, produces down-going seismic energy at 33 milliseconds, pulse 39. A portion of the same energy reflected from the surface and back to this geophone produces pulse 40 at 39 milliseconds. A reflection of this same energy reverberated between the base of the weathered layer and the surface produces a further pulse 41 at 45 milliseconds. Further reverberation between these interfaces would cause a further set of pulses in this series, as is well known to those skilled in this art. Simply to keep from unduly complicating trace 35, the remainder of this reverberation series is not shown.

The next major arrival of down-going seismic waves occurs at 85 milliseconds due to reflection from bed C, reflection from the base of the weathering and impingement on the geophone, pulse 42. Reverberation of this energy between surface and the base of the weathered layer followed by propagation to the geophones results in a further series of pulses 43, 44, etc. It is to be noted that on trace 35, the only seismic events shown are those corresponding to reception of waves either from a directional impulsive shot, or from a non-directional impulsive shot with directional geophones.

Similarly on trace 45, I have shown the response of directionally sensitive geophones responsive only to up-going seismic waves. Such geophones are located exactly at the same spot (i.e., 12 milliseconds down) as were geophones producing traces such as 35. In this case, the shot instant 46 is shown in coincidence with that (36) in trace 35 for ease in comparison of records. The first up-going wave to be received is due to the compressional wave reflected from bed B which arrives at the geophone 15 milliseconds after detonation, as shown by pulse 47. This is labeled also on the trace as reflection B. Following this is a pulse reflected from the surface down to bed B and up to the geophone which arrives at 29 milliseconds, pulse 48. Another up-going pulse is due to energy reflected from bed B, reflected at the base of the weathering and again from bed B to produce a pulse 49 at 43 milliseconds. Reverberation between the base of the weathered layer and the surface before reflection from bed B produces a series of pulses 50, 51, etc., the later members of the series not being shown for clarity.

A second, primary reflection from bed C is shown by the pulse 52 which arrives at 67 milliseconds. This, in turn, is followed by the secondary reflection from the surface to bed C and back up to the geophone, pulse 53 at 81 milliseconds. Reverberation between the base of the weathered layer and the surface before reflection from bed C produces the series of pulses 54–56, etc. Pulse 57 is an interbed multiple reflection from bed C to bed B to bed C and back to the geophone.

As mentioned above, a number of reflections have been omitted in this brief review and description. Also no attempt has been made in the drawing of traces 35 and 45 to take into account the attenuation in amplitude resulting from propagation of the wave, due to dispersion, refraction, reflection, divergence, etc.

Trace 58 represents an amplitude-time signal which can be convolved with trace 35, i.e., the response to downgoing seismic energy, to produce essentially trace 45. Such an operator can be produced by trial and error, or it may be computed in accordance with the principle of the Wiener filter, which it essentially represents. I have found that when such an amplitude-time signal, as shown on trace 58, is produced, that it contains an amplitude only at times corresponding to the primary reflections, and the interbed multiple reflections which have been reflected downward from boundaries below the depth of the shot or the geophone spread, whichever is the deeper. It is to be noticed that on trace 58, which can be directly compared with trace 45, the strong multiples generated by downward reflection from boundaries above the vertical spread (such as from the surface and from the base of the weathered layer) do not appear. Thus, pulse 59 shows the primary reflection from bed B, pulse 60 similarly represents the primary reflection from bed C, and it is only when one reaches pulse 61 that the first interbed multiple reflection is found. When it is considered that the interbed multiple reflections are generally much weaker than most primary reflections, it is apparent that by producing the operator corresponding to trace 58, one has minimized the effect of multiple reflections to a remarkable degree.

It should also be pointed out that there is some utility at times in producing an amplitude-time signal which is the convolution operator which when convolved with the up-coming events trace, such as trace 45, yields the down-traveling events trace 35. In this case, the geophones are at a level above the charge 21. Then the events on the amplitude-time signal comprising this Wiener operator determine basically the primary reflectors lying above the subsurface geophones. Of course, in the majority of cases, the amplitude-time operator shown by trace 58 presents the desirable information.

As earlier mentioned, one can obtained the full equivalent of trace 35 using the directional characteristic of a charge rather than of a geophone. For example, a trace corresponding to trace 35 would be produced by nondirectional reception of waves caused by detonating the directional charge 31 by a cap located at the bottom of this charge (see FIGURE 3), whereas a record equivalent to trace 45 would be produced by detonation of a charge 31 by a cap at the top of this charge.

It is probably apparent that the time duration of the Wiener operator should be about as long as the duration of the record with which it is being convolved, or the record which is the result of this convolution process. The use of a shorter time operator will produce all primary reflections existing up to the termination of the operator but will lack information as to reflectnig beds having greater travel time.

I prefer to determine the time-amplitude characteristic of the convolution operator by the so-called Wiener filter technique, although as mentioned above, a process of trial and error convolution may be employed. The Wiener operator has a function of time $W_\tau$ which is determined from the input signal $S_t$ (i.e., an amplitude-time record equivalent to trace 35) and the desired output signal $D_t$ corresponding to trace 45 by mathematical process, described by Dr. Norbert Wiener in his 1949 publication "Extrapolation, Interpolation, and Smoothing of Stationary Time Series with Engineering Applications," M.I.T. and J. Wiley and Sons. The procedure on a point-to-point basis is described in the co-pending application of Daniel Silverman and Sven Treitel, S.N. 450,806, filed April 26, 1965. It has been described in other works on the statistical theory of communication, for example, in a publication by that name due to Dr. Y. W. Lee published in 1960 by John Wiley and Sons, Inc.

Figure 4:
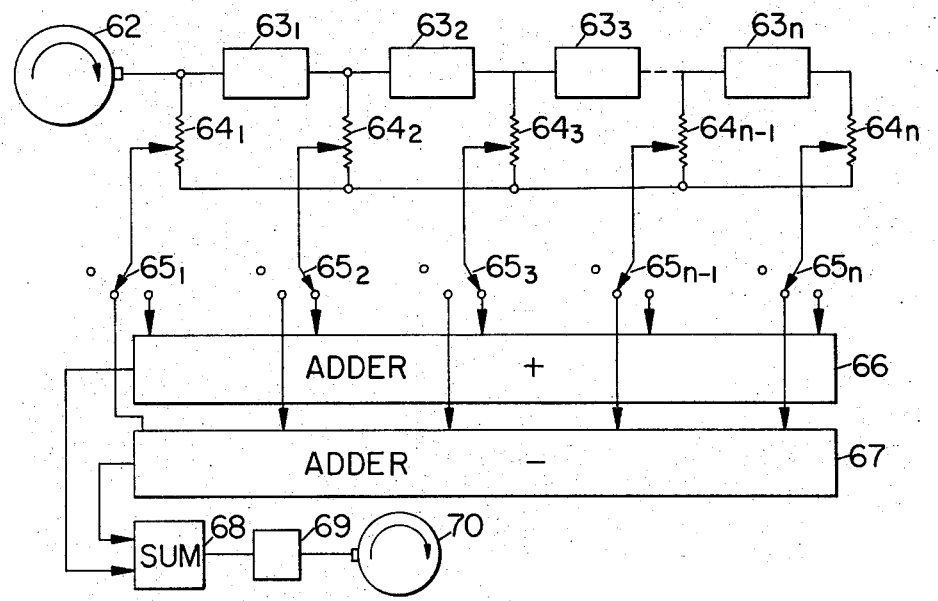
FIGURE 4 is a diagram of apparatus useful for convolving one of the pairs of directionally characteristic records with an amplitude-time signal comprising a Wiener filter to produce a convolved record.

In FIGURE 4, I have shown an apparatus suitable for carrying out the convolution of an amplitude-time signal with a seismic record, for example, the type of record reproducibly recorded in any of the FIGURES 1 to 3, such as trace 35 of FIGURE 5. Such convolution produces the second record such as trace 45. Mathematically this apparatus carries out the determination of the function $A_t(\approx D_t)$ ($A_t$ is the least-squares approximation to $D_t$).

$$D_t \approx A_t = \int W_{(\tau-t)} S_{(t)} dt$$

This apparatus was described in co-pending application S.N. 358,870 of Daniel Silverman which was filed April 10, 1964. The seismic record obtained using either down-sensitive geophones or a directional charge sensitive in the downward direction, as obtained with the apparatus shown in FIGURES 1 to 3, is played back by a reproducer 62. This signal passes through a delay line containing delay units $63_1 \ldots 63_n$, each of which delay the signal by a known amount without essentially distorting its shape. Such delay lines are well known in the art. Potentiometers $64_1 \ldots 64_n$ are adjusted to represent the various values of the selected amplitudes corresponding to the time delays produced by the delay units $63_1 \ldots 63_n$ so that the time delayed signal fed each potentiometer is amplitude modulated in accordance with desired operator. If the algebraic sign of the operator is plus the switch $65_1 \ldots 65_n$ is switched to the + adder 66; if negative, to the − adder 67. Each adder consists of a plural add resistor network which produces at the output a signal directly proportional to the sum of all signal inputs applied to it, as is well known in the art. The output of these units is then added algebraically by a final summation circuit 68 which is then suitably amplified by amplifier 69 and re-recorded by a reproducible recorder 70.

It is apparent from the description given that the apparatus shown in FIGURE 4 convolves the signal played back by reproducer 62 with an amplitude-time signal. Thus, when reproducer 62 generates a trace equivalent to trace 35 a record is made on recorder 70 which can be compared with trace 45 on an oscilloscope or oscillograph (not shown). When the record on recorder 70 is substantially identical with trace 45, the proper operator has been used. One can then make a record of the amplitude-time signal comprising the operator to produce the operator trace 58 of FIGURE 5 containing only the record of primary reflections plus that due to interbed multiple reflections, as described above.

Figure 6:
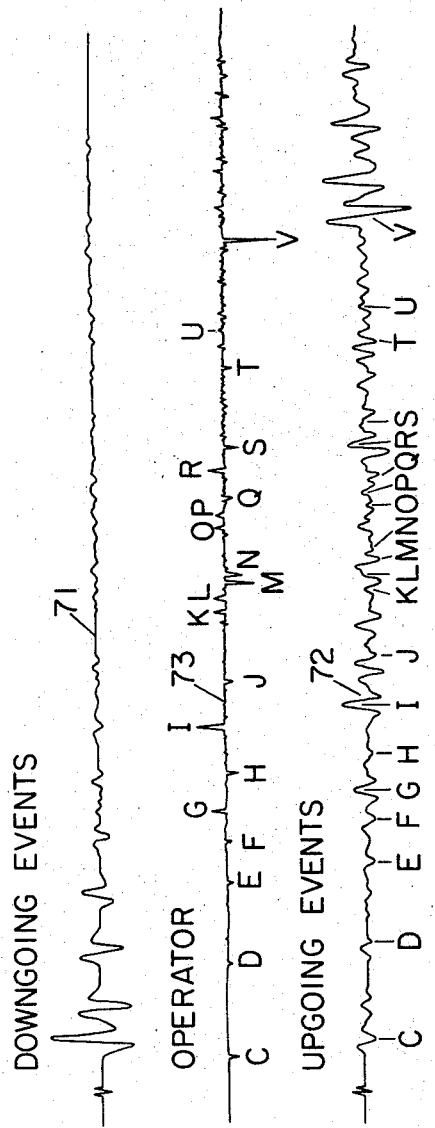
FIGURE 6 represents the types of records of seismic events corresponding to the theoretical situation considered in FIGURE 5.

While FIGURE 5 illustrates the general procedure, it is not as graphic as a representation of the true state of affairs such as is shown in FIGURE 6. In this illustration, trace 71 is the geophone response to downgoing seismic waves plotted as a function of time and is, therefore, analogous to trace 35 of FIGURE 5. Trace 72 is the equivalent time-amplitude trace of the response of a geophone to up-coming waves in the same layered earth as for trace 71. It is apparent from inspection of trace 72 that there have been a number of seismic events taking place, a few of which represent reflections. However, there is sufficient reverberation and other forms of multiple reflections so that it is difficult to identify, in most portions of this record, where the various reflections are occurring.

Trace 73, which has been placed on the same time scale as traces 71 and 72, is the record of the operator which when convolved with the amplitude-time record shown in trace 71 produces essentially the amplitude-time trace 72. This, therefore, is the record of the various primary reflections plus interbed multiples. It is apparent that trace 73 presents the results of a seismic prospect in a much clearer form than in most portions of trace 72 and that one can, therefore, determine the depth to the various reflecting horizons more easily and with greater certainty than was previously the case.

Suitable modifications and variations in the various manipulative steps will be apparent to those skilled in this art. My invention is not limited to the manipulative steps or arrangement of apparatus set out in this specification but is best described by the scope of the appended claims.

I claim:

1. A method of seismic prospecting comprising the steps of
    generating seismic waves within the earth,
    receiving directionally characteristic seismic waves at at least one location,
    separately producing at such receiving location a reproducible record of down-going seismic waves and a reproducible record of up-going seismic waves,
    separately reproducing said down-going and said up-going seismic waves,
    convolving one of said down-going and up-going reproduced seismic waves with an amplitude-time signal comprising a Wiener filter to produce a convolved record substantially matching the other of said down-going and up-going reproduced seismic waves, and
    making a record of said amplitude-time signal.

2. A method in accordance with claim 1 in which the time duration of said amplitude-time signal is substantially the duration of one of said two reproducible records.

3. A method in accordance with claim 1 in which each convolution is made with the record due to down-going seismic waves.

4. A method of minimizing the effect of multiple reflections in seismic prospecting comprising the steps of
    generating seismic waves at least near the surface of the earth,
    receiving directionally characteristic seismic waves at a plurality of locations in a seismic spread,
    producing from each said receiving location a reproducible record of essentially down-going seismic waves and a second reproducible record of essentially up-going seismic waves,
    reproducing seismic waves from each said reproducible record of essentially down-going seismic waves,
    convolving each of said down-going seismic waves with an amplitude-time signal comprising a Wiener filter to produce a convolved record,
    comparing each said convolved record with the respective reproduced up-going seismic wave from said second reproducible record,
    modifying said amplitude-time signal and repeating the step of convolving until said convolved record substantially matches the respective up-going reproduced seismic waves, and
    making a record of said amplitude-time signal.

5. A method in accordance with claim 4 in which said generation of seismic waves is by a non-explosive source producing seismic waves for a time equal to at least a substantial fraction of the travel time of seismic waves reflected from the deepest stratum from which information is desired.

6. A method in accordance with claim 4 in which said generation of seismic waves is by separate detonation at opposite ends of two similar directional charges substantially matched to the velocity of compressional waves in the earth formation where such charges are located, said charges being positioned approximately vertically at approximately the same depth and location, and in which the seismic receivers (which need not be directionally sensitive) are located approximately horizontally near the surface of the earth.

7. A method in accordance with claim 6 in which the convolution is with the record obtained from the detonation from the bottom of one of said two directional charges, to match the corresponding record (at the same location) of the record obtained from the detonation from the top of the other of said two directional charges.

References Cited

UNITED STATES PATENTS

| | | | |
|---|---|---|---|
| 2,740,945 | 4/1956 | Howes | 181—0.5 X |
| 2,770,312 | 11/1956 | Silverman | 181—0.5 |
| 2,794,965 | 6/1957 | Yost | 340—15.5 |
| 2,846,662 | 8/1958 | Sparks | 340—15.5 |
| 3,185,250 | 5/1965 | Glazier | 181—0.5 |
| 3,270,188 | 8/1966 | Ares | 340—15.5 X |

RODNEY D. BENNETT, *Primary Examiner.*

BENJAMIN A. BORCHELT, *Examiner.*

M. F. HUBLER, *Assistant Examiner.*